FERROELECTRIC MEMORY ELEMENT

Filed Nov. 23, 1962

INVENTORS
CRAVENS L. WANLASS
SCOTT H. NELSON
BY John R. Faulkner
John A. Duffy
ATTORNEYS

United States Patent Office 3,264,618
Patented August 2, 1966

3,264,618
FERROELECTRIC MEMORY ELEMENT

Cravens L. Wanlass and Scott H. Nelson, Santa Ana, Calif., assignors to Ford Motor Company, Dearborn, Mich., a corporation of Delaware Filed Nov. 23, 1962, Ser. No. 239,673
4 Claims. (Cl. 340—173.2)

This invention relates to information storage devices for memories and more particularly to memories which utilize ferroelectric elements as the storage device.

In ferroelectric materials internal polarization properties produce a hysteretic relation between an applied electric field and the polarization charge of the material. For certain materials, such as barium titanate, and in certain temperature ranges the hysteresis relationship between the charge polarization and applied electric field is a substantially square hysteresis loop. The characteristic hysteresis loop of the ferroelectric material provides two stable states for charge polarization which permits binary memory storage.

The attempts that have been made to utilize ferroelectric memory elements in memories for the storage of data have been unsatisfactory. The various ferroelectric devices developed to date suffer a number of disadvantages which have prevented their use in commercial quantities primarily due to the fact that ferroelectric elements known in the art have only two electrodes. The readout of a ferroelectric device cannot be obtained from an ad hoc circuit as is possible in magnetic memory elements. Consequently, interrogation methods for reading out of a two-electrode ferroelectric element have been undesirable requiring special circuitry not compatible with present day digital techniques. Nondestructive readout has been unobtainable. Accordingly, it is an object of this invention to provide a ferroelectric storage device of improved readout capability.

According to a principal feature of the ferroelectric storage device of this invention, a four-electrode ferroelectric memory element is provided in which an electric field can be applied either parallel or orthogonal to the polarization axis of the ferroelectric element. Write operations may be provided as in conventional ferroelectric elements on one pair of electrodes with interrogation operations being accomplished by the application of an electric field to the orthogonal electrodes. In this manner, non-destructive interrogation is realized.

It is therefore another object of this invention to provide a ferroelectric storage device of nondestructive readout capability.

It is a further object of this invention to provide a ferroelectric memory element having electrodes for writing operations and electrodes for reading operations.

It is a still further object of this invention to provide a ferroelectric memory element including a pair of electrodes parallel to the polarization axis for interrogate operations, and a pair of electrodes orthogonal to the polarization axis for read and write operations.

Other objects of the invention will become apparent from the following description read in conjunction with the accompanying drawing, in which.

According to a principal aspect of the invention, a ferroelectric memory element is provided including a block of ferroelectric material having a polarization axis and having two stable states of polarization charge. Means are provided for generating an electric field substantially parallel to the polarization axis with the parallel electric field of a magnitude to charge the block in one of said polarization states. Means are provided for generating a transverse electric field substantially orthogonal to the polarization axis with the transverse electric field of a magnitude to change the resultant polarization charge of the ferroelectric block and means are provided for generating a signal varying as a function of the electric field charge in the ferroelectric block.

According to another aspect of the invention write operations are accomplished on the ferroelectric memory element on a pair of electrodes parallel to the polarization axis with the readout circuitry connected to the same parallel electrodes. Interrogation of the ferroelectric element is accomplished by an electric field applied across the orthogonal electrodes of the ferroelectric element.

Figure 1:
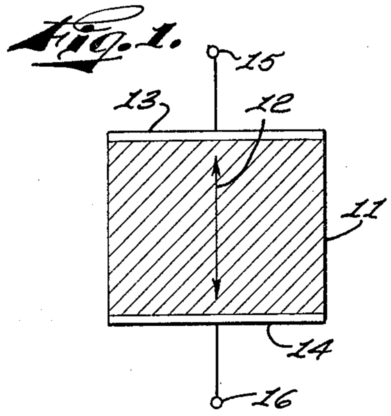
FIG. 1 is a view of a ferroelectric memory element according to the prior art.
Figure 2:
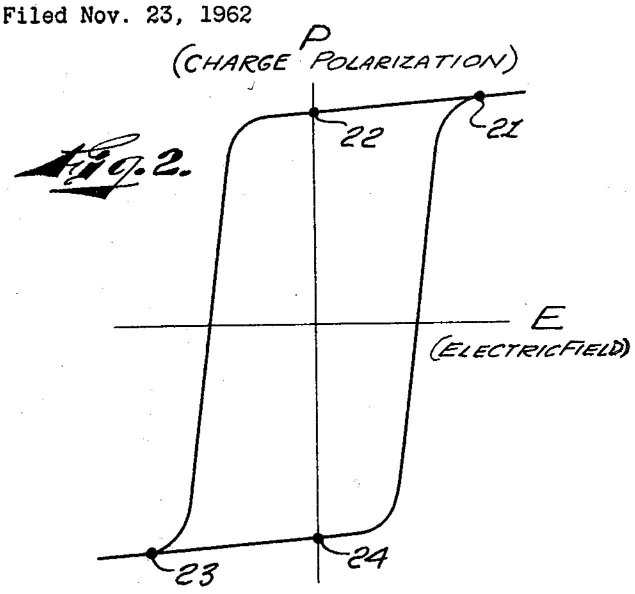
FIG. 2 is a hysteresis diagram of a ferroelectric element.

Referring now to the drawing, and in particular to FIG. 1, there is illustrated a ferroelectric element of the prior art. The ferroelectric element comprises a block 11 made out of materials such as barium titanate or triglycine sulfate which exhibit a hysteretic relationship, as indicated by the diagram of FIG. 2, between the charge polarization along the axis 12 and the electric field applied across electrodes 13 and 14 at the terminals 15 and 16. The electric field induced by the electrodes 13 and 14 is parallel to the polarization axis 12 with the electrodes 13 and 14 attached to the block 11 at right angles to the axis 12.

Utilizing the ferroelectric element of FIG. 1 as a bistable storage device, the storing of a ONE is accomplished by applying an electric field across the terminals 15 and 16 such that the electrode 13 is more positive than the electrode 14. This will cause the polarization of the block 11 to switch into a positive saturation as indicated by the operation point 21 in the hysteresis curve of FIG. 2. When the field across the terminals 15 and 16 is released the operation point will then move to the point 22 on the hysteresis curve which is the remanent state of the block indicative of a stored ONE. Similarly, a ZERO may be stored in the block 11 by the application of an electric signal across the terminals 15 and 16 in an opposite direction with the result being that the polarization of the block 11 is represented by the point 23 on the curve of FIG. 2, and the operating point by the point 24 after the field is removed. Therefore, it may be seen that, in static stability, the polarization of the block 11 of FIG. 1 is at point 22 if a ONE is stored and the polarization is at point 24 if a ZERO is stored.

As previously pointed out the disadvantages of the ferroelectric element of FIG. 1, such as special circuitry required for readout operations, inability to obtain nondestructive readout, and special temperature requirements, have prevented the use of ferroelectric elements in commercial quantities.

Figure 3:
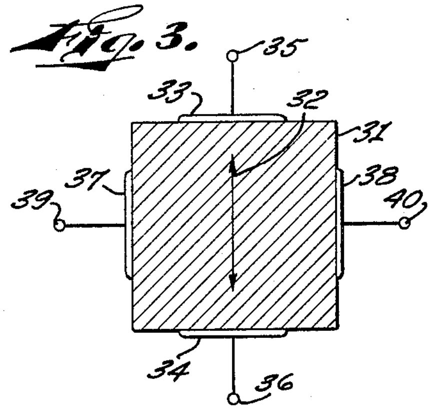
FIG. 3 is a view of a ferroelectric memory element according to the device of this invention.

Referring now to FIG. 3, there is illustrated the ferroelectric memory element of this invention which provides nondestructive readout without special circuitry. In the device of FIG. 3, a block 31 of ferroelectric material exhibiting a hysteretic relationship between the charge polarization and the electric field as illustrated in the curve of FIG. 2, has a polarization axis 32 and a pair of electrodes 33 and 34 attached to the block 31 and responsive to terminals 35 and 36 for applying an electric field to the block 31 in parallel with the polarization axis 32. The block 31 also has a pair of electrodes 37 and 38 attached to the block and responsive to terminals 39 and 40 for applying an electric field to the block 31 substantially orthogonal to the polarization axis 32. The electrodes 33 and 34 responsive to signals across the terminals 35 and 36 are utilized for write operations for polarizing the block 31 in either of the stable states shown as points 22 and 24 on the hysteresis curve of FIG. 2. In this manner a ONE indicated at the point 22 or a ZERO indicated at the point 24 is stored in the block 31. The electrodes 37 and 38 are responsive to signals at the terminals 39 and 40 during interrogate operations. Interrogation is accomplished by the application of a unidirectional pulsed electric signal at the terminals 39 and 40. This produces a field in a direction orthogonal to the polarization axis 32. This cross field disturbs the polarization of the block 31 causing an unbalance which changes the magnitude of the polarization charge providing an output pulse across the terminals 35 and 36 whose polarity is indicative of the polarization state of the block 31. The application of an interrogate pulse across the terminals 39 and 40 to disturb the polarization of the charge 31 provides an output pulse across the electrodes 35 and 36 utilized in a dual purpose as sense electrodes as well as write electrodes does not change the polarization state of the block 31. After removal of the interrogate pulse from the terminals 39 and 40, the polarization state of the block 31 remains the same either at the point 22 or at the point 24 of the hysteresis curve of FIG. 2. Thus, it may be seen that a nondestructive readout may be realized from the block 31 by the application of an electric field to the electrodes 37 and 38 orthogonal to the electric field across the write electrodes 33 and 34.

Figure 4:
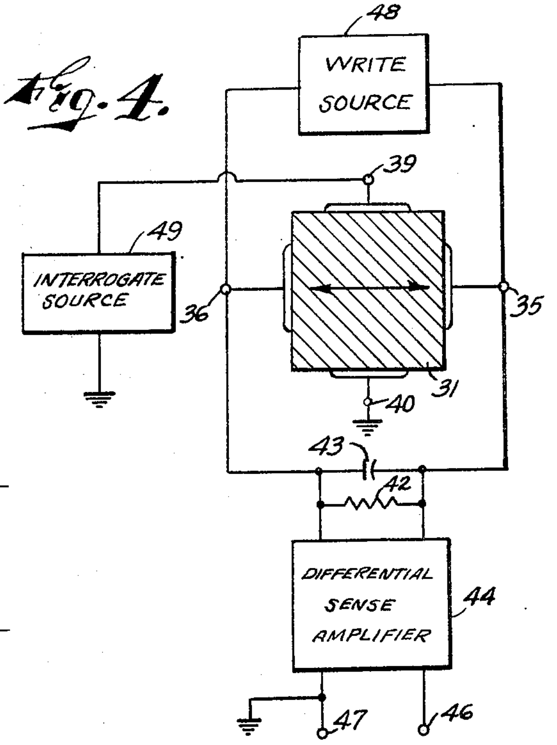
FIG. 4 is a ferroelectric element according to the invention including the circuitry for readout operations.

Referring now to FIG. 4, there is illustrated a nondestructive readout memory circuit employing the block 31 of FIG. 3. A write source 48 is connected to terminals 35 and 36 for setting block 31 to one of the two stable states 22 and 24 according to the information to be stored. The terminals 35 and 36 also are connected through a resistor-capacitor filtering circuit comprising the resistor 42 and the capacitor 43 to the input of a differential sense amplifier 44. A source 49 of unidirectional interrogate pulses is connected between a point of reference potential and terminal 39. Terminal 40 is returned to a point of fixed reference potential. Upon application of a unidirectional pulsed signal across the terminals 39 and 40 with the terminal 40 grounded, a signal is induced at the terminals 35 and 36 indicative of the state of storage of the block 31. Sense amplifier 44 supplies a signal at terminals 46 and 47 which is representative of the signal induced between terminals 35 and 36.

Figure 5:
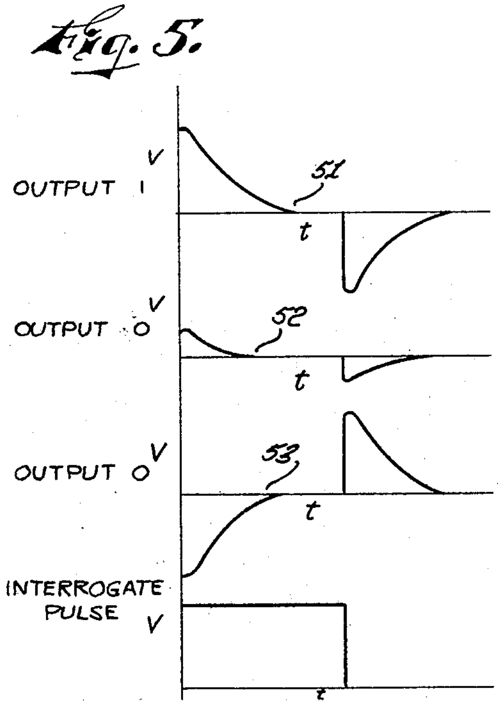
FIG. 5 is a diagram illustrating the operation of the memory element of FIG. 3.

Referring to the diagrams of FIG. 5 in conjunction with the circuit of FIG. 4, a stored ONE is indicated at the output terminals 35 and 36 as a positive pulse followed by a negative back swing pulse as shown by the wave form 51 in FIG. 5. A stored ZERO is indicated at the terminals 35 and 36 by either a much smaller positive pulse followed by a smaller negative pulse as indicated by the diagram 52 or a negative pulse followed by a positive pulse indicated by the diagram of 53. Either of the wave forms 52 or 53 may be realized for a stored ZERO depending upon the relationship of the coupling between the four electrodes 33, 34, 37, and 38 of the block 31. The coupling is a function of the particular characteristics of the material of the block 31 and the electrode spacing. The change in coupling is caused by the interaction of the applied orthogonal field across the terminals 39 and 40 and the internal field produced by spontaneous polarization caused when the applied field is across the terminals 35 and 36 for write operations. The magnitude of the output signal of the diagram 51 indicating that a ONE is stored may be of the order of 20 to 50 millivolts and is a direct function of the magnitude of voltage across the terminals 39 and 40 and the electrode area of the electrodes 37 and 38 on the block 31. No change in polarization of the block 31 is caused by the signal across the interrogate terminals 39 and 40 thereby producing a nondestructive readout.

The four-electrode ferromagnetic element of this invention is capable of nondestructive interrogation without the addition of special circuit techniques, costly recirculating equipment is eliminated and efficiency and speed of operation is increased since the interrogation does not involve switching of the polarization. Greater repetition rates with lower power requirements may thus be realized.

Although the invention has been described and illustrated in detail, it is to be clearly understood that the same is by way of illustration and example only and is not taken by way of limitation, the spirit and scope of this invention being limited only by the terms of the appended claims.

We claim:

1. A nondestructive readout memory system comprising a block of ferroelectric material having a polarization axis and two stable states of polarization charge, a first pair of electrodes positioned on said block to produce in said block in response to a signal supplied to said electrodes an electric field parallel to said polarization axis, a second pair of electrodes positioned on said block to produce in said block in response to a signal supplied to said second pair of electrodes an electric field substantially perpendicular to said polarization axis, a source of write signals selectively generating write signals of one or the opposite polarity representative respectively of binary ONES and ZEROS and of magnitude sufficient to change the charge state of said ferroelectric block, means connecting said source of write signals between said first pair of electrodes, a source of unipolar interrogate pulses having a magnitude sufficient to affect the instantaneous charge state of said block, means connecting said source of interrogate pulses between said second pair of electrodes, and output means, comprising charge sensing means connected between said first pair of electrodes, for sensing the change in charge between said first pair of electrodes.

2. A memory system according to claim 1 wherein said block of ferroelectric material comprises first pair of faces perpendicular to said polarization axis and a second pair of faces parallel to said polarization axis and wherein said first and second pairs of electrodes are disposed on said first and said second pairs of faces, respectively.

3. A memory system according to claim 1 wherein said charge sensing means comprises a differential amplifier and wherein the input terminals of said amplifier are connected to said first pair of electrodes.

4. A memory system according to claim 2 wherein said charge sensing means comprises a differential amplifier and wherein the input terminals of said amplifier are connected to said first pair of electrodes.

References Cited by the Examiner

UNITED STATES PATENTS 3,032,706 5/1962 Wieder ............ 340—173.2

OTHER REFERENCES

Pages 1738–1793, December 1955, Proceedings of the IRE, "Some Aspects of Ferro-Electricity," by Shirane et al.

BERNARD KONICK, *Primary Examiner.*

IRVING L. SRAGOW, *Examiner.*

T. W. FEARS, *Assistant Examiner.*